(No Model.)
J. MERICLE.
DEVICE FOR WITHDRAWING THE PIPES FROM DRIVEN WELLS.
No. 338,427. Patented Mar. 23, 1886.
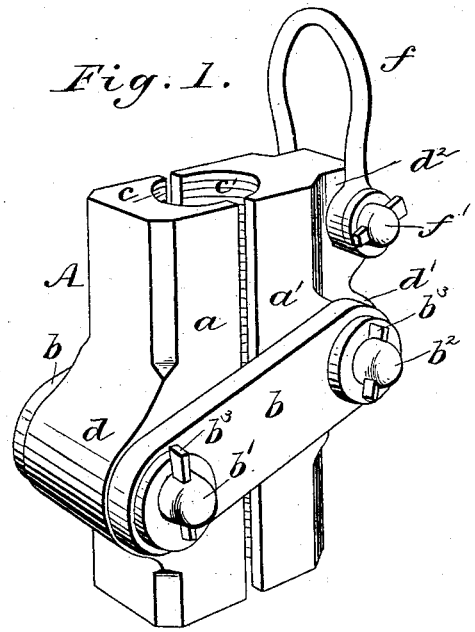
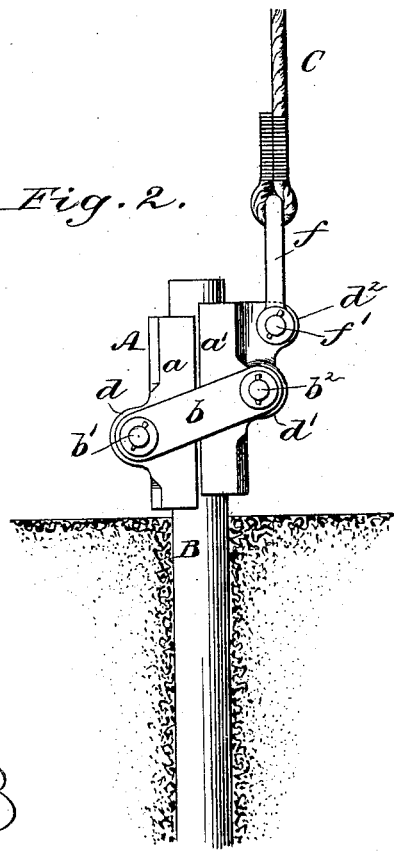
WITNESSES:
INVENTOR:
BY
ATTORNEYS.

UNITED STATES PATENT OFFICE.

JAMES MERICLE, OF PATCHOGUE, NEW YORK, ASSIGNOR TO HIMSELF AND WILLIAM T. SHAW, OF SAME PLACE.

DEVICE FOR WITHDRAWING THE PIPES FROM DRIVEN WELLS.

SPECIFICATION forming part of Letters Patent No. 338,427, dated March 23, 1886.

Application filed December 12, 1885. Serial No. 185,475. (No model.)

*To all whom it may concern:*

Be it known that I, JAMES MERICLE, of Patchogue, in the county of Suffolk and State of New York, have invented a new and Improved Device for Withdrawing the Pipes of Driven Wells, of which the following is a full, clear, and exact description.

It often occurs that the pipes of driven wells have to be withdrawn from the ground for cleaning or for repairs, after which they are driven back into the ground again. The work of lifting the pipe as now conducted is difficult, as great difficulty is experienced in grasping the pipe so that a lifting power can be applied to it.

The object of my invention is to furnish a practical device by which the pipe may be grappled and lifted with great facility; and to this end the invention consists, principally, of two pipe-grappling jaws made concaved upon their adjacent faces and linked together, one of the jaws being provided or formed with a clevis or other device for attachment to a chain or other connection for applying power to the device.

The invention also consists of the construction, arrangement, and combination of parts, all as hereinafter described and claimed.

Reference is to be had to the accompanying drawings, forming part of this specification, in which similar letters of reference indicate corresponding parts in both the figures.

Figure 1 is a perspective view of my pipe-grappling device, and Fig. 2 is a side elevation showing the same applied for lifting a well-pipe.

A represents the pipe-grappling device applied to the well-pipe B, and C represents a rope attached to the clevis $f$ of the grappling device for connecting the grappling device A to any power for lifting the pipe B. In case lever-power is used for lifting the pipe, the lever may be applied directly to the clevis $f$ or to any enlargement or projection formed upon or attached to the grapple.

The grapple A is composed, essentially, of the two jaws $a\ a'$, joined together by the link-plates $b\ b$ and pivots or pins $b'\ b^2$. The jaws $a\ a'$ are concaved upon their inner faces, as shown at $c\ c'$, so the jaws will fit upon the opposite sides of a pipe, and the concaved surfaces may be roughened or notched, as shown in Fig. 1, to avoid all danger of the jaws slipping upon the pipe; and the concaved surfaces of the jaws are of less radius than the pipe to be lifted, so the edges of the jaws will not meet around the pipe and prevent the jaws from grasping it.

The jaw $a$ is formed with the enlargement $d$, through which an opening is formed to receive the pin $b'$, and the opposite jaw, $a'$, is formed with the enlargement $d'$, through which an opening is formed to receive the pin $b'$, and the jaw $a'$ is formed also with the enlargement $d^2$, through which an opening is formed to receive the pin or bolt $f'$, that holds the clevis $f$. The enlargement $d$ for the pin or bolt $b'$ is made slightly below the center of the length of the jaw $a$, while the enlargement $d'$ for the opposite bolt, $b^2$, is made at or slightly above the center of the length of the jaw $a'$, so that when the jaw $a'$ is drawn upward by power applied at the clevis $f$ or other part of the jaw the link-plates $b\ b$ will act to draw the jaws together and cause them to firmly grasp the pipe. When the jaw $a'$ is lifted, the plates $b\ b$ will stand on an incline, which increases in pitch as the jaw $a'$ ascends in advance of the jaw $a$, thus shortening the distance between the jaws, which has the effect of closing the jaws firmly upon the pipe. When the jaw $a'$ is lowered, the link-plates $b\ b$ approach a horizontal position, and thus force the jaws $a\ a'$ apart, so that they may be detached from the pipe or easily lowered upon it for a new hold.

In lowering the jaws upon the pipe for a new hold, in case there is a joint in the pipe, which the jaws linked together will not pass, one of the bolts, $b'$ or $b^2$, may be removed by simply displacing the key $b^3$ and the jaws separated and then united again upon the pipe below the joint. In this manner the device is adapted for very rapid use, and it is very effective and practical for its purpose.

I do not confine myself to the use of my invention for withdrawing the pipes of driven wells, as it is adapted for various uses.

Having thus described my invention, what I claim as new, and desire to secure by Letters Patent, is—

1. The pipe-shackle or grasping device herein shown and described, the same consisting of two jaws linked together and made concaved upon their adjacent faces, one of the jaws being formed or provided with means for receiving or attaching the device to a power connection, substantially as described.

2. The jaws $a$ $a'$, made concaved upon their adjacent faces and linked together by the plates $b$ and bolts $b'$, the connection of the plates $b$ to the jaw $a$ being below the center thereof, while the connection of the plates $b$ to the jaw $a'$ is at or above the center thereof, substantially as described.

3. The concaved jaws $a$ $a'$, linked together by the plates $b$ $b$ and bolts $b'$ $b'$, in combination with the clevis $f$, attached to the jaw $a'$, substantially as and for the purposes set forth.

JAMES MERICLE.

Witnesses:
HAVENS MARVIN,
EDWARD T. MOORE.